May 23, 1950

E. E. CAVALLIN 2,508,373

DIMPLING TOOL FOR AIDING IN
THE REMOVAL OF FASTENERS

Filed July 10, 1946

INVENTOR.
EDWARD E. CAVALLIN
BY
M. O. Hayes
ATTORNEY

Patented May 23, 1950

2,508,373

UNITED STATES PATENT OFFICE 2,508,373

DIMPLING TOOL FOR AIDING IN THE REMOVAL OF FASTENERS

Edward E. Cavallin, San Diego, Calif.

Application July 10, 1946, Serial No. 682,520

4 Claims. (Cl. 81—15)

(Granted under the act of March 3, 1883, as amended April 30, 1928; 370 O. G. 757)

This invention relates to a tool, and more particularly to a dimpling tool for aiding in the removal of fasteners of the dzus type, as exemplified by Dzus Patent 1,986,329.

Fasteners of the dzus type, commonly used to hold sheet metal hatches on aircraft, are subject to wear and must often be replaced before the hatch itself wears out. In the past, it has been customary to drive the fastener out with a hammer blow, thereby mutilating, to a certain extent, the edges of the hole in which the fastener was placed. Thereafter the setting of a new replacement fastener was somewhat unsatisfactory because of the torn and jagged hole edge.

It is an object of this invention to provide a tool whereby the hole in which a dzus fastener is located may be smoothly and uniformly enlarged without damage to the metal surrounding the hole.

It is another object to provide a tool capable of dimpling the edge of a hole while a dzus fastener is still located in the hole.

In accomplishing these and other objects of the present invention, I have provided improved details of structure, the preferred form of which is illustrated in the accompanying drawing, wherein.

Dzus fasteners, such as are used to hold hatches to the sides of an aircraft, are of two types. One type employs a grommet which is inserted in the hole at the same time that the fastener is applied thereto. The removal of this type of fastener, for replacement with a new fastener, is accomplished by simply striking with a hammer to drive the fastener from the hole. This mutilates the grommet but leaves the edge of the hole substantially intact. A new grommet and fastener may then be applied.

The second type of fastener does not employ a grommet, using merely the edge of the fastener hole as a holding means for the fastener. It is to this type that the tool of this invention is applicable.

In originally applying a dzus fastener to a hole in a hatch, the hole is first dimpled by applying a dimpling tool to the edge of the hole and uniformly bending back the edge until the hole is large enough to pass the body of the fastener. The fastener is then inserted and the edge of the hole returned to normal by use of an anti-dimpling tool.

When it became necessary to replace a fastener, the dimpling tool could not be used because its application to the edge of the hole was prevented by the presence of the fastener itself. As a result, standard practice was to simply drive the fastener out of the hole without first dimpling the edge. This left the edge jagged and torn, so that it was not only less adaptable to be reformed by the anti-dimpling tool, but even after reformation, it provided poorer support for the fastener because of the uneven tears therein.

In accordance with the present invention, a dimpling tool is provided comprising a ring having a tapered cross section, which may be inserted between the head of a dzus fastener and the metal plate containing the fastener mounting hole. A blow on the head of the fastener causes the tool to dimple the edge of the hole, thereby enlarging it to permit free extraction of the fastener to be replaced. The ring is split into two segments to permit it to be applied around the fastener.

Figure 1:
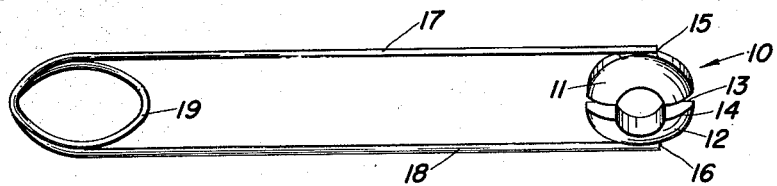
Fig. 1 shows a perspective view of the dimpling tool of this invention.

Referring now to the drawing, the tool is shown in Fig. 1 comprising a metal ring 10 consisting of two opposed semi-circular segments 11 and 12. In cross-section, each segment has a flat surface 13 on the upper side thereof and a rounded or convex surface 14 on the under side thereof, the latter surface tapering toward the outside of the ring, so as to be disposed generally at an acute angle with respect to the axis of the ring. It will be readily seen from Fig. 3 that the above construction gives the ring a thickness, in a direction parallel to the axis, which is greater at the inner edge than at the outer edge. On the outer edges 15 and 16 of segments 11 and 12, respectively, are connected arms 17 and 18, respectively, lying in a plane substantially parallel to that of ring 10. Arms 17 and 18 are preferably formed from a single piece of resilient material, such as heavy wire, having a loop 19 therein disposed at the extreme end of the tool from ring 10. Loop 19 forms a spring means for biasing apart, to a limited extent, segments 11 and 12 of ring 10.

Operation

Figure 2:
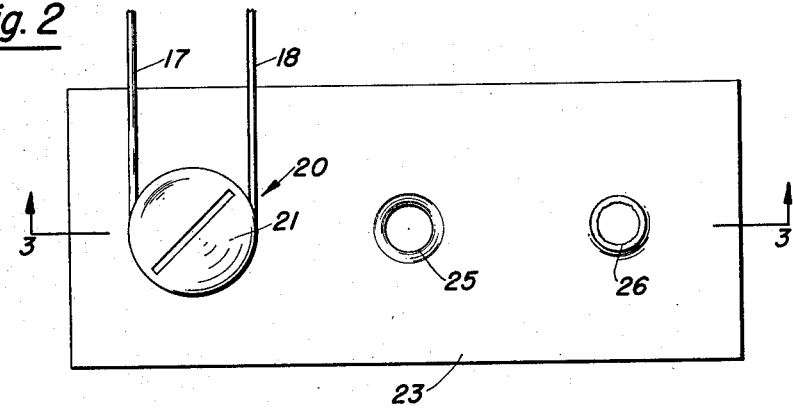
Fig. 2 shows the manner in which the tool of Fig. 1 is applied under the head of a dzus fastener preparatory to dimpling the edge of the fastener hole.

The use of the tool of Fig. 1 will now be described with particular reference to Figs. 2 and 3. The tool is grasped in one hand and segments 11 and 12 are disposed around a dzus fastener 20. Arms 17 and 18 are then squeezed together, bringing segments 11 and 12 together under head 21 of fastener 20.

Figure 3:
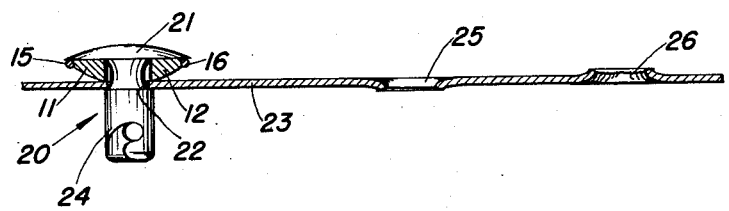
Fig. 3 illustrates a cross-section of the tool and fastener to which it is applied, taken along line 3—3 of Fig. 2.

In this position, as shown in Fig. 3, the tapered surface 14 of ring 10 is brought to bear against the edge of hole 22 in which fastener 20 is mounted. A sharp blow with a hammer against head 21 drives the tapered surface of ring 10 against the edge of hole 22 in metal sheet 23, enlarging the hole to a diameter slightly exceeding that of body 24 of fastener 20. After fastener 20 has been removed, the edge of the dimpled hole presents a neat and unjagged appearance as shown at 25.

Following removal of fastener 20 by the use of this tool, the hole is ready to receive a new fastener. At this point the hole presents the same appearance as it did during the original installation of the fastener, when a standard dimpling tool was used.

Without this tool, it has been necessary in the past to strike a heavy blow against body 24 of fastener 20, driving the shoulder of body 24 against the edge of hole 22 and enlarging the hole in an uneven manner leaving a jagged edge shown at 26.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. A dimpling tool for aiding in the removal of fasteners of the dzus type comprising a split ring, the thickness of said ring in a direction parallel to the ring axis being greater at the inner edge than at the outer edge, and means connecting the two parts of the split ring and permitting the ring to be opened for insertion under the head of a fastener of the dzus type.

2. A dimpling tool for aiding in the removal of fasteners of the dzus type, comprising a ring split into two segments, the thickness of said ring in a direction parallel to the ring axis being greater at the inner edge than at the outer edge; a pair of arms connected at their inner ends, respectively, to said segments, the other ends of said arms being connected together; and spring means at the common connection between said arms tending to bias said segments apart.

3. A dimpling tool for aiding in the removal of fasteners of the dzus type, comprising a ring split into two segments, the under surface of the ring being generally convex with respect to the axis of the ring; a pair of arms connected at their ends, respectively, to said two segments, the other ends of said arms being connected together; and spring means at the common connection between said arms tending to bias said segments apart.

4. A dimpling tool for aiding in the removal of fasteners of the dzus type, comprising a ring split into two segments, the under surface of the ring being generally convex with respect to the axis of the ring, and means connecting said segments and permitting the ring to be opened for insertion under the head of a fastener of the dzus type.

EDWARD E. CAVALLIN.

REFERENCES CITED

The following references are of record in the file of this patent:

UNITED STATES PATENTS

| Number | Name | Date |
|---|---|---|
| 324,391 | Lindsley | Aug. 18, 1885 |